US012725027B2

(12) United States Patent
Kang et al.

(10) Patent No.: US 12,725,027 B2
(45) Date of Patent: Sep. 1, 2026

(54) PROACTIVE ANOMALY DETECTION

(71) Applicant: International Business Machines Corporation, Armonk, NY (US)

(72) Inventors: Hui Kang, Briarcliff Manor, NY (US); Xinyu Que, Yorktown Heights, NY (US); Yu Deng, Yorktown Heights, NY (US); Sinem Guven Kaya, New York, NY (US); Bruce D'Amora, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 17/106,298

(22) Filed: Nov. 30, 2020

(65) Prior Publication Data

US 2022/0172037 A1 Jun. 2, 2022

(51) Int. Cl.
*G06N 3/08* (2023.01)
*G06F 11/30* (2006.01)
(Continued)

(52) U.S. Cl.
CPC ............. *G06N 3/08* (2013.01); *G06F 11/302* (2013.01); *G06F 11/3495* (2013.01);
(Continued)

(58) Field of Classification Search
CPC .......... G06N 3/08; G06N 3/045; G06N 3/044; G06F 11/302; G06F 11/3495; G06F 11/3466
See application file for complete search history.

(56) References Cited

U.S. PATENT DOCUMENTS

| | | | |
|---|---|---|---|
| 7,933,794 | B2 | 4/2011 | Adi |
| 8,041,797 | B2 | 10/2011 | Childress |

(Continued)

FOREIGN PATENT DOCUMENTS

| | | | |
|---|---|---|---|
| CN | 109067619 | A | 12/2018 |
| CN | 110362494 | A | 10/2019 |

(Continued)

OTHER PUBLICATIONS

Guan, Zijie, Jinjin Lin, and Pengfei Chen. "On anomaly detection and root cause analysis of microservice systems." Service-Oriented Computing—ICSOC 2018 Workshops: ADMS, ASOCA, ISYyCC, CIoTS, DDBS, and NLS4IoT, Hangzhou, China, Nov. 12-15, 2018 (Year: 2018).*

(Continued)

*Primary Examiner* — Sherrod L Keaton
*Assistant Examiner* — Nicholas S Wu
(74) *Attorney, Agent, or Firm* — Anthony M. Pallone

(57) ABSTRACT

Embodiments of the present invention provide computer implemented methods, computer program products and computer systems. For example, embodiments of the present invention can, in response to receiving a request, collect trace data and specifications for a sequence of requests for normal behavior of a microservice application. Embodiments of the present invention can then generate request contextual features from the collected trace data and specification. Embodiments of the present invention can then train a neural network model based on the generated contextual features; and predicting anomalous behavior of the microservice application using the trained neural network model.

15 Claims, 8 Drawing Sheets

(51) Int. Cl.
*G06F 11/34* (2006.01)
*G06N 3/044* (2023.01)
*G06N 3/045* (2023.01)

(52) U.S. Cl.
CPC .......... *G06F 11/3466* (2013.01); *G06N 3/044* (2023.01); *G06N 3/045* (2023.01)

(56) References Cited

U.S. PATENT DOCUMENTS

| | | | | |
|---|---|---|---|---|
| 10,009,234 | B2 | 6/2018 | Blondeau | |
| 10,068,301 | B2 | 9/2018 | Kogut-O'Connell | |
| 10,521,811 | B2 | 12/2019 | Rai | |
| 10,574,657 | B1 * | 2/2020 | Govil | H04L 63/10 |
| 11,843,505 | B1 * | 12/2023 | Cruise | G06F 16/953 |
| 2009/0018813 | A1 | 1/2009 | Kothari | |
| 2014/0149175 | A1 | 5/2014 | Abbott | |
| 2014/0223427 | A1 | 8/2014 | Bootland et al. | |
| 2016/0140474 | A1 | 5/2016 | Vekker | |
| 2017/0091781 | A1 | 3/2017 | Puvvala | |
| 2018/0270125 | A1 | 9/2018 | Jain et al. | |
| 2019/0028496 | A1 | 1/2019 | Fenoglio et al. | |
| 2020/0043008 | A1 * | 2/2020 | Hrabik | G06Q 20/4016 |
| 2020/0174774 | A1 | 6/2020 | Natarajan | |
| 2020/0287923 | A1 | 9/2020 | Raghavendra et al. | |
| 2020/0313979 | A1 * | 10/2020 | Kumaran | H04L 41/16 |
| 2021/0152584 | A1 * | 5/2021 | Chakravarty | H04L 63/1425 |
| 2023/0370491 | A1 * | 11/2023 | Crabtree | G06N 3/098 |

FOREIGN PATENT DOCUMENTS

| | | | |
|---|---|---|---|
| CN | 110825589 | A | 2/2020 |
| CN | 111459760 | A | 7/2020 |
| CN | 111913789 | A | 11/2020 |
| WO | 2020050920 | A1 | 3/2020 |
| WO | 2022111154 | A1 | 6/2022 |

OTHER PUBLICATIONS

Nedelkoski, Sasho, Jorge Cardoso, and Odej Kao. "Anomaly detection from system tracing data using multimodal deep learning." 2019 IEEE 12th International Conference on Cloud Computing (Cloud). IEEE, 2019. (Year: 2019).*

Chen, Hongyang, Pengfei Chen, and Guangba Yu. "A framework of virtual war room and matrix sketch-based streaming anomaly detection for microservice systems." IEEE Access 8 (2020): 43413-43426. (Year: 2020).*

Anand, Vaastav, et al. "Aggregate-driven trace visualizations for performance debugging." arXiv preprint arXiv:2010.13681 (2020). (Year: 2020).*

Vakilinia, Shahin, et al. "Automated enforcement of SLA for cloud services." 2018 IEEE 11th International Conference on Cloud Computing (Cloud). IEEE, 2018. (Year: 2018).*

Nedelkoski, Sasho, Jorge Cardoso, and Odej Kao. "Anomaly detection and classification using distributed tracing and deep learning." 2019 19th IEEE/ACM international symposium on cluster, cloud and grid computing (CCGRID). IEEE, 2019. (Year: 2019).*

Masouros, Dimosthenis, Sotirios Xydis, and Dimitrios Soudris. "Rusty: Runtime interference-aware predictive monitoring for modern multi-tenant systems." IEEE Transactions on Parallel and Distributed Systems 32.1 (2020): 184-198. (Year: 2020).*

Qiu, Haoran, et al. "{FIRM}: An intelligent fine-grained resource management framework for {SLO-Oriented} microservices." 14th USENIX symposium on operating systems design and implementation (OSDI 20). 2020. (Year: 2020).*

"Patent Cooperation Treaty PCT Notification of Transmittal of the International Search Report and the Written Opinion of the International Searching Authority, or the Declaration", Applicant's file reference EIE210796PCT, International application No. PCT/CN2021/125261, International filing date Oct. 21, 2021 (Oct. 21, 2021), Date of mailing Jan. 19, 2022 (Jan. 19, 2022), 10 pages.

Jayathilaka et al., "Performance Monitoring and Root Cause Analysis for Cloud-hosted Web Applications", © 2017 International World Wide Web Conference Committee (IW3C2), 10 pages, <:http://dx.doi.org/10.1145/3038912.3052649>.

Weng et al., "Root Cause Analysis of Anomalies of Multitier Services in Public Clouds", Conference Paper . Jun. 2017, DOI: 10.1109/IWQoS.2017.7969155, 7 pages.

Ouyang et al., "Reducing Late-Timing Failure at Scale: Straggler Root-Cause Analysis in Cloud Datacenters." Submitted on May 17, 2016, 3 pages, <https://hal.archives-ouvertes.fr/hal-01316515>.

Nedelkoski et al., "Anomaly Detection and Classification using Distributed Tracing and Deep Learning, " 2019 19th IEEE/ACM International Symposium on Cluster, Cloud and Grid Computing (CCGRID), DOI 10.1109/CCGRID.2019.00038, 10 pages.

Gan et al., "Leveraging Deep Learning to Improve the Performance Predictability of Cloud Microservices", arXiv:1905.00968v1 [cs.DC] May 2, 2019, 15 pages.

Japan Patent Office, "Notice of Reasons for Refusal," Feb. 4, 2025, 8 Pages, JP Application No. 2023-532550.

* cited by examiner

700

```
// Done once for a
request
receive_request()
{
        request_spe
c()
}
function_call()
{
        start_trace()
        // business
logic
        end_trace()
}
```

```
// Done once for an
instance
agent_init()
{
        static_info()
}
receive_trace()
{
        resource_info
()
}
```

FIG. 7B

PROACTIVE ANOMALY DETECTION

BACKGROUND

The present invention relates in general to proactive anomaly detection and in particular to proactive anomaly detection for microservice applications using request contextual data and neural networks.

Microservice architecture arranges an application as a collection of loosely coupled services. A microservice is not a layer within a monolithic application (e.g., the web controller, or the backend-for-frontend). In this manner, microservice architecture lends itself to a continuous delivery software development process. A change to a small part of the application only requires rebuilding and redeploying only one or a small number of services.

Typically, microservices architectures can be adopted for cloud-native applications, serverless computing, and applications using lightweight container deployment. In a monolithic approach, an application supporting three functions (e.g., frameworks, databases, message brokers, etc.) would have to be scaled in its entirety even if only one of these functions had a resource constraint. With microservices, only the microservice supporting the function with resource constraints needs to be scaled out, thus providing resource and cost optimization benefits Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

In machine learning, a hyperparameter is a configuration that is external to the model and whose value cannot be estimated from data. Hyperparameters are used in processes to help estimate model parameters. Hyperparameter are set before the learning (e.g., training) process begins by contrast, the values of other parameters are derived via training. Different model training algorithms require different hyperparameters, some simple algorithms, such as least squares regression, require none. Given a set of hyperparameters, a training algorithm learns the parameter values from the data for instance, least absolute shrinkage and selection operator (LASSO) is an algorithm that adds a regularization hyperparameter to least squares regression, required to be set before estimating the parameters through the training algorithm. Similar machine learning models can require different hyperparameters (e.g., different constraints, weights, or learning rates) to generalize different data patterns.

Deep learning is a branch of machine learning based on a set of algorithms that model high-level abstractions in data by using model architectures, with complex structures or otherwise, often composed of multiple non-linear transformations. Deep learning is part of a broader family of machine learning methods based on learning representations of data. An observation (e.g., an image) can be represented in many ways such as a vector of intensity values per pixel, or in a more abstract way as a set of edges, regions of particular shape, etc. Some representations make it easier to learn tasks (e.g., face recognition or facial expression recognition) from examples. Deep learning algorithms often use a cascade of many layers of nonlinear processing units for feature extraction and transformation. Each successive layer uses the output from the previous layer as input. The algorithms may be supervised or unsupervised, and applications include pattern analysis (unsupervised) and classification (supervised). Deep learning models include Artificial Neural Networks (ANNs) inspired by information processing and distributed communication nodes in biological systems. ANNs have various differences from biological brains.

Neural networks (NNs) are computing systems inspired by biological neural networks. NNs are not simply algorithms, but rather a framework for many different machine learning algorithms to work together and process complex data inputs. Such systems "learn" to perform tasks by considering examples, generally without being programmed with any task-specific rules. For example, in image recognition, NNs learn to identify images that contain cats by analyzing example images that are correctly labeled as "cat" or "not cat" and using the results to identify cats in other images. NNs accomplish this without any prior knowledge about cats, for example, that cats have fur, tails, whiskers, and pointy ears. Instead, NNs automatically generate identifying characteristics from the learning material. NNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common NN implementations, the signal at a connection between artificial neurons is a real number, and the output of each artificial neuron is computed by some nonlinear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

SUMMARY

According to an aspect of the present invention, there is provided a computer-implemented method. The method comprises: in response to receiving a request, collecting trace data and specifications for a sequence of requests for normal behavior of a microservice application; generating request contextual features from the collected trace data and specification; training a neural network model based on the generated contextual features; and predicting anomalous behavior of the microservice application using the trained neural network model.

BRIEF DESCRIPTION OF THE DRAWINGS

Preferred embodiments of the present invention will now be described, by way of example only, with reference to the following drawings, in which:

FIGS. 7A and 7B shows example data collection codes, in accordance with an embodiment of the present invention.

DETAILED DESCRIPTION

Embodiments of the present invention that microservice architecture is often used for applications deployed in hybrid cloud environments because the loosely coupled components offer better scalability, flexibility, maintainability, and accelerated developer productivity. Such applications are composed of many services, which are in turn duplicated to several instances and run in different geographical locations. Over time, degraded performance due to anomalies can occur. As such, embodiments of the present invention further recognizing that detecting anomalies in microservice applications is a critical task that enables certain actions to be taken that can help mitigate downtime and loss of productivity. Current systems struggle with monitoring microservices application and optimizing performance due to limited observability. Further, embodiments of the present invention recognize that typical approaches to anomaly detection currently lack the ability to consider spatial and temporal dependencies among services which can lead to more false positives. Accordingly, embodiments of the present invention provide solutions to improve current anomaly detection systems and provides an efficient tool for technical service support personnel managing complex microservice applications. For example, embodiments of the present invention detect anomalies based on contextual data using a neural network. In this manner, as described in greater detail later in this Specification, embodiments of the present invention predict performance anomalies (e.g., a Service Level Agreement (SLA) violation) in an application that jointly considers dependencies available in the request contextual data using a neural network approach. Embodiments of the present invention can then generate a notification and subsequently correct the detected anomaly prior to a user's awareness.

Figure 1:
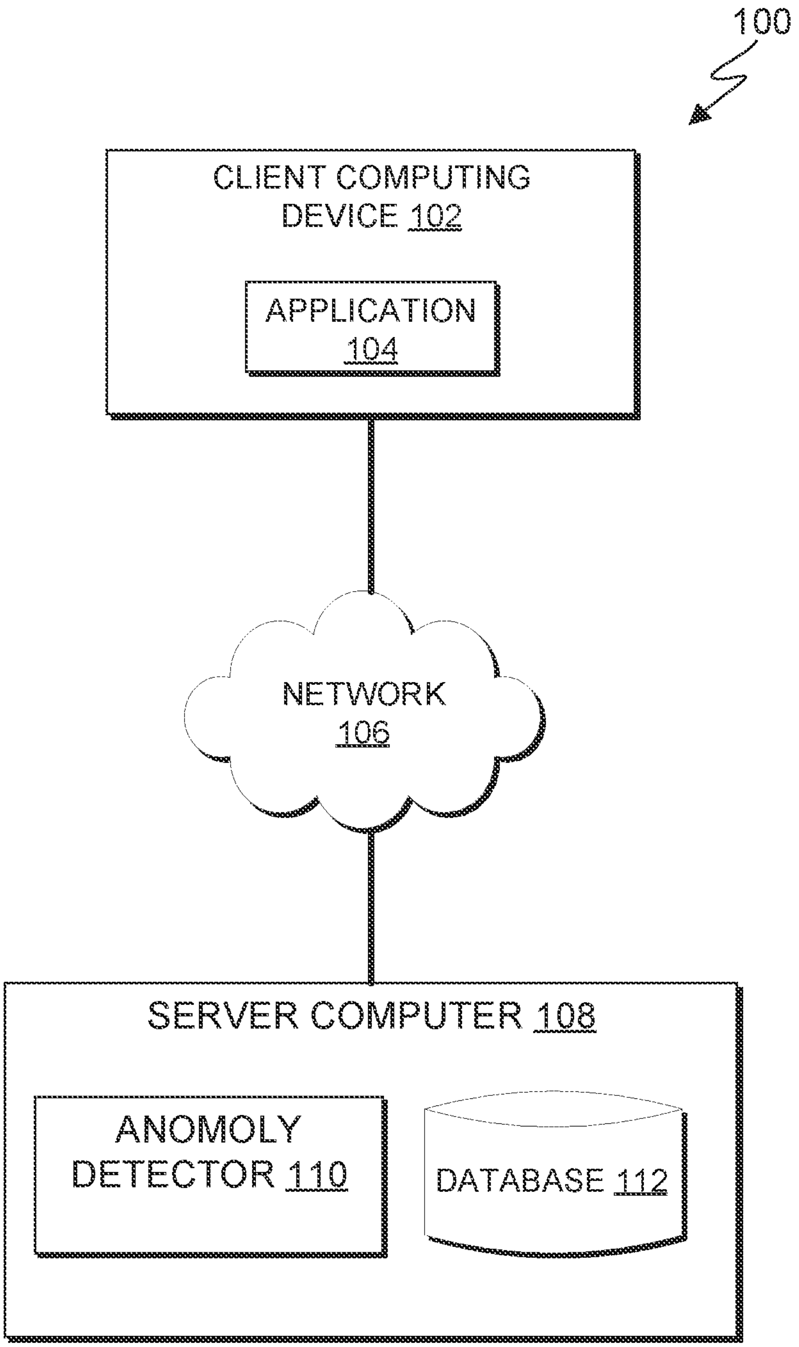
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a web server, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access anomaly detector 110 (e.g., using TCP/IP) or receive service requests and database information. Application 104 can further communicate with anomaly detector 110 to identify contextual features associated with a received request, generate or otherwise train a neural network model, and use the generated neural network model to predict future requests processed within a microservice application, as discussed in greater detail with regard to FIGS. 2-5.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts anomaly detector 110 and database 112. In this embodiment, server computer 108 can reside in cloud architecture (e.g., public, hybrid, or private). In this embodiment, anomaly detector 110 resides on server computer 108. In other embodiments, anomaly detector 110 can have an instance of the program (not shown) stored locally on client computer device 102. In other embodiments, anomaly detector 110 can be a standalone program or system that trains a multilingual neural network intent classifier. In yet other embodiments, anomaly detector 110 can be stored on any number or computing devices.

Anomaly detector 110 empowers proactive anomaly detection for microservice applications by considering the dependencies in the request contextual data using a neural network approach. The solution provided by anomaly detector 110 is independent of the deployment of the microservice application (e.g., private cloud, public cloud, or hybrid) and supports a variety of container orchestrators (e.g., Kubernetes, OpenShift, etc.). Anomaly detector 110 provides a mechanism for hybrid data collection based on both application and system behavior. In this embodiment, anomaly detector 110 can include one or more components described in greater detail with respect to FIG. 2.

For example, anomaly detector 110 can receive an end user request for an application comprises N microservices. At each microservice instance, a respective collection agent (associated with anomaly detector 110), extract trace data and specifications of each respective instance. A collector agent of anomaly detector 110 then compiles the received information (respective trace data and specifications) and normalizes the received information. From there, the collector agent can push the data to a queue for persistence. A feature extraction module (shown and described in FIG. 2) transforms the raw data into the request contextual features. Anomaly detector 110 can then use the formatted contextual features to build a neural network model and subsequently generate predictions using the built model. Anomaly detector 110 can then generate a proactive alert.

In this embodiment, anomaly detector 110 can, in response to receiving requests to predict an anomalous behavior, request additional information from a respective microservice. The additional information can include contextual features, that is, a hierarchal data structure that represents the end to end details of a request. The contextual features can include one or more casually related services and call path. The contextual features can further include execution context (e.g., CPU, accelerator, memory utilization, region of the pod, network traffic, I/O requests, etc.) at each service instance.

For example, a request for additional information (e.g., request-specification), a microservice path and a function path. Examples of an additional information can include a username associated with a user (anonymized ID), corporate name (anonymized ID), latency (e.g., 500 ms), region (e.g., Europe), browser type, device type, operating system, time (e.g., Friday, Feb. 28, 2020 2:55:02 PM GMT-05:00).

An example of a microservice path can include a path from Microservice A to Microservice B. For example, cluster ID, region (us), instance ID, duration (100 ms), OS spec (CPU, memory, disk, network) associated with Microservice A and a respective cluster ID, region (us), instance ID, duration (400 ms), OS spec (CPU, memory, disk, network) for Microservice B.

An example of a call path (i.e., function path), could include one or more functions. For example, functions one through three: function one includes duration (40 ms), resource utilization (20%, 100 MB,) function two includes duration (60 ms), resource utilization (20%, 100 MB) back to function one including duration (400 ms), resource utilization (20%, 100 MB).

In this embodiment, anomaly detector 110 provides a hybrid data collection to request the contextual features, that is, the request for contextual features can be sent to or otherwise collected from difference sources. In this embodiment anomaly detector 110 includes a collection agent (shown and discussed in FIG. 2) that is deployed within each microservice instance as a side car (e.g., two containers of a single Kubernetes Pod) and can pull from two different sources: trace data from the microservice such as Jaeger, and OpenTelemetry) and characteristics of the microservice runtime (e.g., CPU, memory utilizations, network, other collocated sidecars, Zabbix-Agent (e.g., CPU, Disk, memory, etc.), Istio's Envoy (e.g., network), etc.).

From these sources, anomaly detector 110 can collect categorical data and numerical data. In this embodiment, categorical data refers to a request and microservice instance that are extracted from either the request header or the environment variables on the deployment host. In this embodiment, numerical data refers to data that reports the time spent on each microservice and its critical functions from distributed tracing library such as OpenTelemetry or Jaeger. In this manner, anomaly detector 110 can leverage the numerical data reports that report, record, and retrieve information on respective system utilization with proper privileges. Accordingly, by collecting contextual features from different sources, anomaly detector 110 can enable a holistic view of processing the request across layers.

Anomaly detector 110 can then use the collected contextual features (i.e., the additional information) to build and train a neural network model that can predict future requests processed within a respective microservice application, handling the aforementioned request contextual feature as inputs hierarchically.

In this manner, anomaly detector 110 (using the built neural network model) can capture inter-request and intra-request factors and use the captured factors to predict future requests. In this embodiment, an inter-request describes connections among characteristics in request-specifications (e.g., a login request of a user id from certain region is highly likely to be followed by a get_request to the product catalog page from the same region user id). In this embodiment, an intra-request factor takes into account the factors of individual requests to understand which services during the processing path play the most important roles for future requests from the casually related microservice- and function path data. By considering these two factors, the built neural network model can capture the correlation between a respective microservice and the last step. For example, historic requests from a microservice can take two paths. The first path can utilize microservices A, B, and C having respective latencies of 40 ms, 15 ms, and 300 ms. The second path can utilize microservices A, B, and D having respective latencies of 200 ms, 40 ms, and 1.2 s. The built neural network can predict the pathway of using microservice A, B, and D, utilizing microservice D when latency at microservice A is high. For example, microservice A can have a latency of 300 ms and microservice B can have a latency of 50 ms. In this example, anomaly detector 110 can predict (using the built neural network) the next request should be processed at microservice D which has a latency of 2 s rather than C which has a latency of 100 ms and at time 2.35 s, anomaly detector 110 can send an alert (e.g., 2.35 s=300 ms (A)+50 ms (B)+2 s (D). The trace path (A→B→D)) is the prediction results of the neural network model, which captures the correlation between the duration of A and the selection of the last time. This is request (for a prediction) through the neural network model that is built and later shown and described with respect to FIGS. 3 and 4. Specifically, the LSTM model will be trained to learning the sequential relationship between the microservices and predict which will be the next one to be used.

Figure 2:
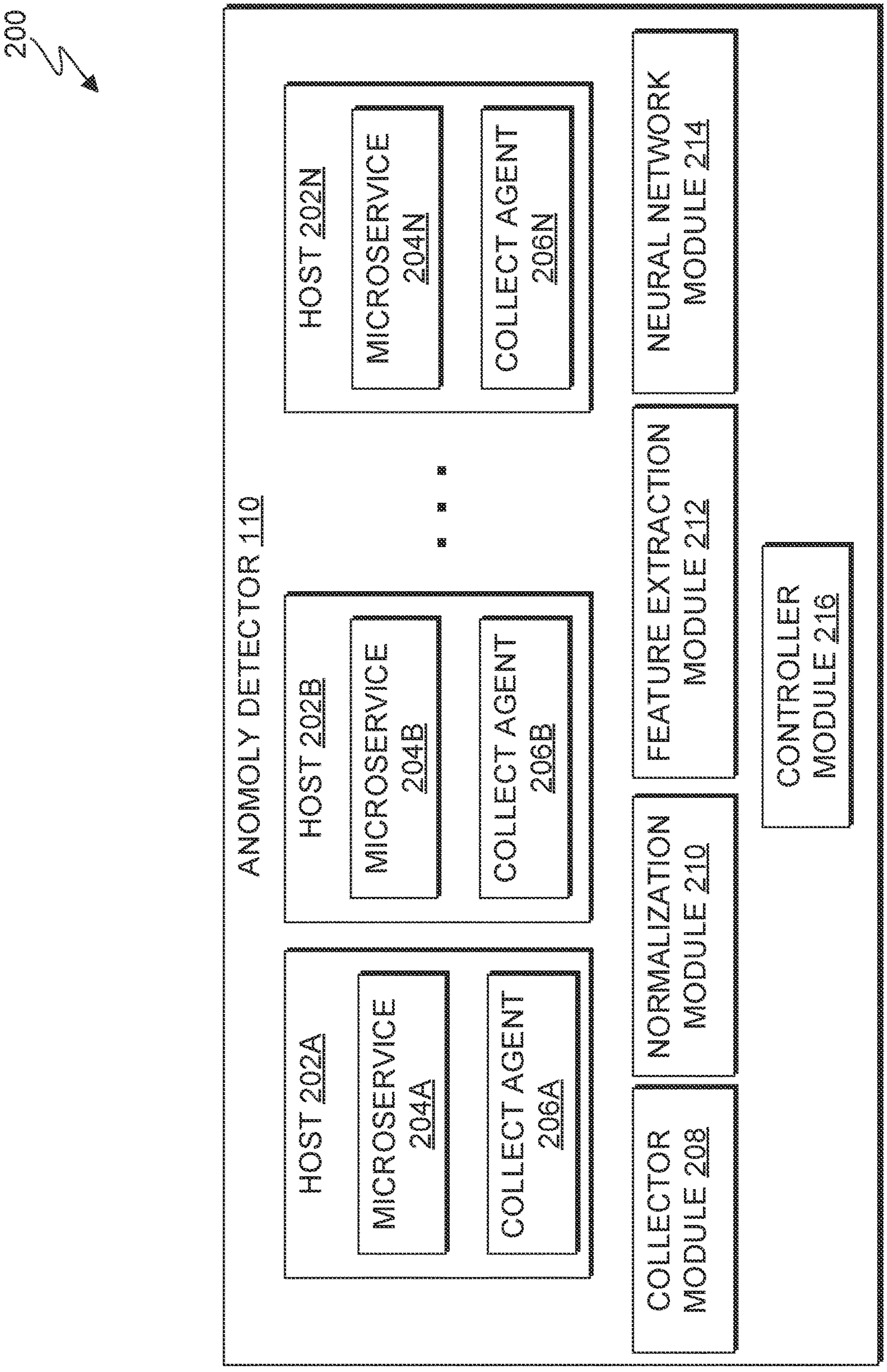
FIG. 2 depicts an example block diagram of an anomaly detector for microservices, in accordance with an embodiment of the present invention.

In this embodiment anomaly detector 110 can utilize a controller shown and described in FIG. 2) to interpret the sequence of predictions and decide whether an anomaly will occur. In this embodiment, the controller weighs key performance metrics (e.g., latency, throughput, failed RPC calls, etc.) In this embodiment, key performance metrics can be determined or otherwise defined by the owner of the microservice application. The controller calculates the statistical measures (e.g., deviation, percentile), and determine whether to raise a proactive alert. For example, the controller can calculate a deviation according to the following formula: deviation=|xi−average(X)|. In this embodiment, the larger the deviation is, the more unstable is the data set which indicates certain anomaly. In this embodiment, percentile is defined as a certain percentage of scores fall below that number. For example, the 50th percentile of an order list of numbers is its median.

In this embodiment, anomaly detector 110 can generate a proactive alert in response to predicted anomalous behavior. The generated proactive alert can include reasons for why the anomaly was predicted and/or otherwise flagged. In this embodiment, the proactive alert can be generated by a component of anomaly detector 110 (e.g., a controller, shown and described in FIG. 2). In this embodiment, the controller can generate appropriate visualization, the proactive alert, generate a root cause report, provide resource management capabilities and system simulation.

For example, anomaly detector 110 can generate a visualization of respective components that process an end user request. The request can be sent to the following cloud infrastructure containing the following components: frontend service, a router service, a dispatcher service, an adapter service, on premises infrastructure (e.g., legacy code), consumer, backend service, and private cloud Software as a service (SaaS) containing databases in two different locations (e.g., United States and Europe). In this example, anomaly detector 110 can generate a visualization of each respective component and function path of the request as well as generate one or more graphical icons to visually show that the detected root cause could be one of the service (e.g., the dispatcher). In this manner, anomaly detector 110 can generate a visualization of the end to end execution flow of the abnormal requests and highlight the dispatcher server as the root cause.

In this embodiment, the root cause report contains the predicted anomalous service and the possible reason along with a proactive alert that is generated that includes the reasoning. Continuing the example above, the root cause report can include a description of the anomalous behavior in the dispatcher and generate a proactive alert that there is long latency affect end users that violate the Service Level Agreement.

In this embodiment, anomaly detector 110 can provide resource management capabilities that alert a system admin and take appropriate action. For example, if the reason for a predicted anomaly is caused by insufficient computing resources such as CPU, low memory, slow network latency, the system admin can provision more resources before it impacts the application clients.

In this embodiment, anomaly detector 110 can also provide system simulation. For example, the prediction results contain the details of the end to end execution flow at each microservice including CPU, memory, disk, and network usage. Such fine-grained characterized traces provide insights of the application demanding on the underlying hardware system, which can be used as the driver of the system simulator to evaluate the potential cloud system designs to learn the challenges and trade-offs (e.g., local versus remote, routing flow/traffic control, brawny vs wimpy cores, latency requirement, offloading benefits, etc.). This process helps the cloud system designers to understand the interactions between different composable hardware components such as storage, network, CPU, memory and accelerator from various applications. It also helps to analyze the potential benefits vs. degradations with various hardware configurations and guide the design decision for the future cloud system.

In an end to end example, a system handled by anomaly detector 110 can receive a request for processing. The request can be sent to the following cloud infrastructure containing the following components: frontend service, a router service, a dispatcher service, an adapter service, on premises infrastructure (e.g., legacy code), consumer, backend service, and private cloud Software as a service (SaaS) containing databases in two different locations (e.g., United States and Europe).

In a first scenario, the request can be processed by the frontend service, sent to the router, to an adaptor back to the consumer, and finally the backend component. In this scenario, anomaly detector 110 can generate a proactive alert in response to predicting that either the dispatcher and the backend service experience long latency affecting end users and violating the SLA. By using anomaly detector 110, the anomalous behavior in despatcher and backend service is detected and appropriately attributed as the service instances that are causing the delay. In contrast, current systems using predictive models yield less accurate results (e.g., low accuracy) due to mixed logs collected from concurrent requests. Embodiments of the present invention (e.g., anomaly detector 110) differs from current approaches in that the request contextual data contain traces which separate the logs into individual requests. For example, a router service is processing ten requests concurrently, four of them will be routed to dispatcher and the others to backend. Current approaches may only look at the mixed log data, which are interleaved due to the concurrent processing. Therefore, when one or more requests fail, it is hard to identify which one is failed. In contrast, anomaly detector 110, provides trace data (i.e., request contextual data), we can identify which request failed at which service.

In a second scenario utilizing the above-mentioned components, anomaly detector 110 can predict that the backend service is experience a slow response from a database storing the user information and can generate a proactive alert that tells a user of a delayed response for a certain set of users. In contrast, current systems have difficult detecting problems to statistics on the aggregated metrics. In some scenarios, the aggregated metrics could mislead the monitoring component. For example, the average latency below certain threshold does not necessarily mean the system is healthy. In this example, if 90% of traffic is routed to the Europe (EU) DB and 10% to the United States (US) DB. When the EU DB is normal and the US DB service is anomalous, the average latency will still look normal because 90% of the requests have normal latency. Instead, our model (e.g., anomaly detector 110) considers latency of individual trace so that we can identify the anomaly on the execution path to the US DB.

In a third scenario utilizing the above-mentioned components, anomaly detector 110 can predict that the job initiated by the dispatcher service can not be complete due to degraded performance at legacy code and generate an alert that the delay in backend receiving results from the consumer. In contrast, current systems have difficult to model the asynchronous relationship using metrics of logs of the producer and consumer. Current systems use log data to train the machine learning model. As mentioned earlier, log data collected from individual are interleaved such that the causal relationship is hard to derived. Instead, since the request context is built on top of trace, anomaly detector 110 avoids this issue.

Anomaly detector 110 can further leverage the results of the prediction to perform root cause analysis, resource management and system simulation. For example, the results of the prediction can be used to drive the system simulator to understand the potential benefits and degradations from various hardware configurations, as well as guiding the design decision for the future cloud system.

Database 112 stores received information and can be representative of one or more databases that give permissioned access to anomaly detector 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

FIG. 2 depicts an example block diagram 200 of an anomaly detector for microservices, in accordance with an embodiment of the present invention.

This example diagram shows one or more components of anomaly detector 110. In some embodiments, anomaly detector 110 can include one or more hosts with respective microservices and collect agents, however, it should be understood that anomaly detector 110 can access microservices and collect agents across a cloud architecture.

In this example, anomaly detector can include host 202A, host 202B through 202N. Each host can have a respective microservice and collect agent, (e.g., respective microservice 204A-N and collect agent 206A-N)

In this example, anomaly detector 110 can receive an end user request microservice 204A via collect agent 206A. In this example, collect agent 206 can receive requests from an end user and also receive requests from one or more other components (e.g., other collocated sidecars, Zabbix-Agent (e.g., CPU, Disk, memory, etc.), Istio's Envoy (e.g., network), etc.).

Collect agent 206A is responsible for collect requests and extracting trace data and specifications of each respective instance. In this embodiment, the respective collect agent can interface with a collector module (e.g., collector module 206) of anomaly detector 110. Collector module 206 is responsible for compiling the received information (respective trace data and specifications). Collector module 206 can then use normalization module 210 to normalize the data, that is, normalization module 210 normalizes the data into a consistent format, (e.g., JSON or a common data structure). Collector module 206 can then push the compiled information into a queue for persistence.

Feature extraction module 213 can then accessed the data in the queue and extract contextual features from the compiled data. In other words, feature extraction module 210 transforms the raw data into the request contextual features. For example, the request contextual features (i.e., request-specification) can comprise: Username (anonymized ID), corporate name (anonymized ID), latency (500 ms), region (EU), browser (Firefox), device (iOS), time (Friday, Feb. 28, 2020 2:55:02 PM GMT-05:00), a respective microservice path (e.g., a path from Microservice A to Microservice B. For example, cluster ID, region (us), instance ID, duration (100 ms), OS spec (CPU, memory, disk, network) associated with Microservice A and a respective cluster ID, region (us), instance ID, duration (400 ms), OS spec (CPU, memory, disk, network) for Microservice B), and function path (e.g., functions one through three: function one includes duration (40 ms), resource utilization (20%, 100 MB,) function two includes duration (60 ms), resource utilization (20%, 100 MB) back to function one including duration (400 ms), resource utilization (20%, 100 MB)).

Figure 3:
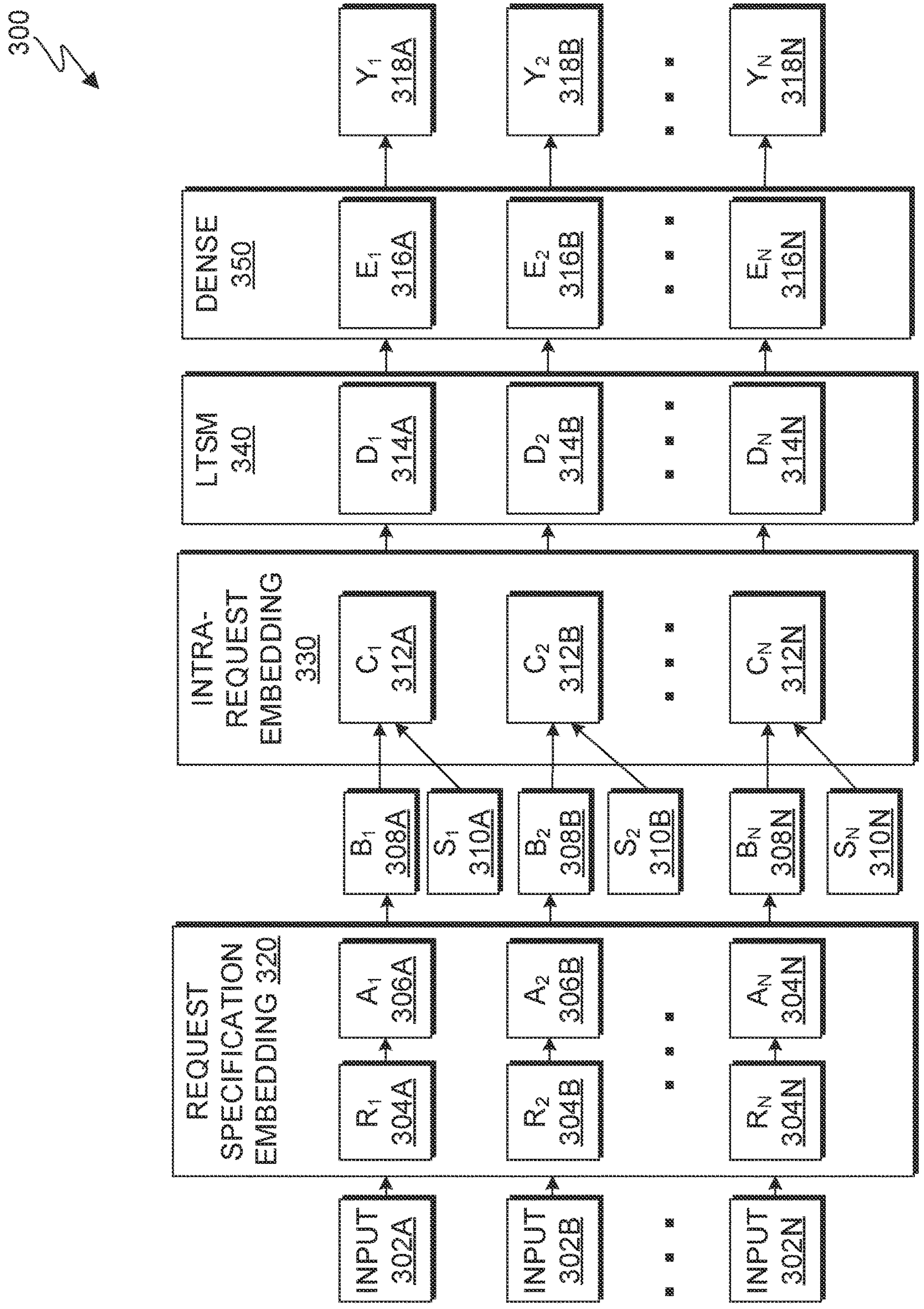
FIG. 3 depicts an example block diagram for a design of a neural networking model, in accordance with an embodiment of the present invention.
Figure 4:
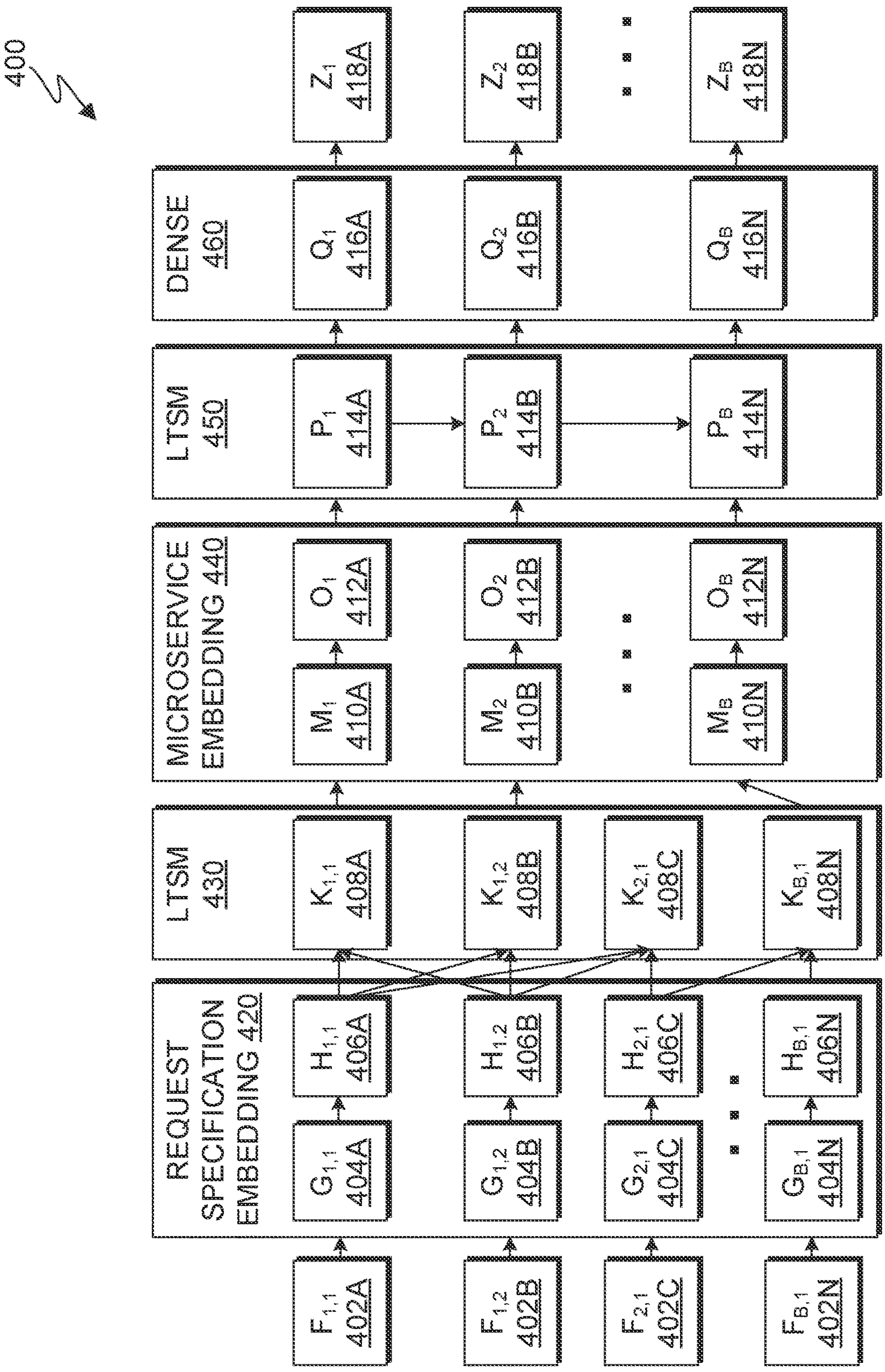
FIG. 4 depicts an example block diagram of a neural networking model capturing intra-request factors for individual requests, in accordance with an embodiment of the present invention.

Anomaly detector 110 can then use the formatted contextual features to build a neural network model using the neural network module 214 (shown and describe in FIGS. 3 and 4). Controller module 216 can then subsequently generate predictions using the built neural network model and can generate appropriate visualization, the proactive alert, generate a root cause report, provide resource management capabilities and system simulation.

FIG. 3 depicts an example block diagram 300 for a design of a neural networking model, in accordance with an embodiment of the present invention.

Specifically, block diagram 300 depicts a design of the neural network (some hidden layers are omitted). The inputs are the request-specifications of a series of requests. The input Si to the intra-request embedding layer is the output of the microservice-path neural network model, shown and described in FIG. 4.

In this example, anomy detector 110 receives input 302A, 302B, through 302N (r1 spec). For example, a request input, i.e., additional information can include a contextual hierarchical structure trace data collected during a specified time (e.g., a time window, T). This requested input can include a request-specification, a microservice path and a function path. Examples of an additional information of the request-specification can include a username associated with a user (anonymized ID), corporate name (anonymized ID), latency (e.g., 500 ms), region (e.g., Europe), browser type, device type, operating system, time (e.g., Friday, Feb. 28, 2020 2:55:02 PM GMT-05:00).

An example of a microservice path can include a path from Microservice A to Microservice B. For example, cluster ID, region (us), instance ID, duration (100 ms), OS spec (CPU, memory, disk, network) associated with Microservice A and a respective cluster ID, region (us), instance ID, duration (400 ms), OS spec (CPU, memory, disk, network) for Microservice B.

An example of a call path (i.e., function path), could include one or more functions. For example, functions one through three: function one includes duration (40 ms), resource utilization (20%, 100 MB,) function two includes duration (60 ms), resource utilization (20%, 100 MB) back to function one including duration (400 ms), resource utilization (20%, 100 MB).

The received input is then processed in block 320 for request specification embedding (e.g., r1 and a1, respectively 304*a-n* and 306*a-n*). In this embodiment, "r1" is the embedding results of string parts in the request specification, (e.g., username, browser type, etc.) while "a1" refers to numerical parts associated with the request specification. In this embodiment, anomy detector 110 concatenates the embedded results with the numerical part of the request specification (e.g., latency, referred to as a1-an).

Anomaly detector can then combine the embedded request specification with components b1 and s1, respectively referred to as 308*a-n* and 310*a-n*. In this embodiment, b1-bN are the output of embedding the request specification. In this embodiment, S1 is the output of the model described in FIG. 4. In this embodiment, S1 represents the modeled output of end to end execution flow of a single request.

The process continues for intra-request embedding in block 330. The intra request factor comprises B1 S1 and C1. In this embodiment, B1, S1 and C1 are related to a single request specification. Similarly, B2, S2, and C1 are related to another request specification. C1 is the embedding layer (referred to as 312A-N) to convert the combination of B1 and S1 to a vector.

The process continues to add the inter-request factor which comprises blocks 340 and 350 (e.g., LTSM 340 and Dense 350). In block 340, the contextual features are fed through a Long Term Short Term (LSTM) architecture used in the field of deep learning and D1 is added, respectively referred to as 314A-N. In this embodiment, D1 is a single unit of an LSTM model. Recall that C1, C2, . . . CN are the modeled output of individual requests. Anomaly detector 110 uses an LSTM model to learn the inter-request relationship between requests. In this embodiment, D1-Dn are the unit of the LSTM model. Finally, in dense 350, E1 is added, referred to as 316A-N. In this embodiment, E1-EN are the unit of a densely connected network, which reduces the dimension of the input in order to find their inner correlations. The resultant output is $Y_1$, $Y_2$, through $Y_N$, respectively referenced as $\mathbf{318}_{A-N}$.

FIG. 4 depicts an example block diagram 400 of a neural networking model capturing intra-request factors for individual requests, in accordance with an embodiment of the present invention.

The inputs (e.g., $F_{1,1}$, $F_{1,2}$, $F_{2,1}$, and $F_{B1}$, respectively referred to as 402A, 402B, 402C, and 402N) are the descriptions of the functions in request-specifications of a series of requests. Anomaly detector 110 takes the received input and performs request specification embedding (e.g., block 420). In this embodiment, $G_{1,1}$, $G_{1,2}$, $G_{2,1}$ and $G_{B,1}$ are referenced as 404A, 404B, 404C through 404N while $H_{1,1}$ $H_{1,2}$ $H_{2,1}$, and $H_{B,1}$ are referenced as 406A, 406B, 406C, and 406N respectively. $G_{1,1}$, $G_{1,2}$ are the embedding layer for the string parts in the function $F_{1,1}$. Similar, $G_{2,1}$ is the embedding unit for the string parts in function $F_{2,1}$, $H_{1,1}$ represents the concatenation of $G_{1,1}$ and the numerical part of $F_{1,1}$. Collectively 404A-N and 406A-N function in a similar manner as 304A-N and 306A-N as described in FIG. 3.

In this embodiment, the embedded request specification is fed through a Long short-term memory (LSTM), an artificial recurrent neural network (RNN) in block 430 and respective $K_{1,1}$, $K_{1,2}$, $K_{2,1}$, and $K_{B,1}$ (i.e., units of the LTSM model are respectively referenced as 408A, 408B, 408C, and 408N) are added.

Processing continues to block 440 for microservice embedding where $M_1$, $M_2$ and $M_B$ and $O_1$, $O_2$ and $O_B$ are respectively added, $M_1$, $M_2$ and $M_B$ are referenced as blocks 410A, 410B, and 410N are the output of the LTSM model (e.g., block 430) that represent B microservices, while $O_1$, $O_2$ and $O_B$ are referenced as blocks 412A, 412B, and 412N, respectively and reference the embedding of the specifications of B microservices.

Processing then continues to block 450 where the result of block 440 are fed through another LTSM layer where $P_1$, $P_2$ and $P_B$ are respectively added. $P_1$, $P_2$ and $P_B$ are referenced as blocks 414A, 414B, and 414N, respectively. In this embodiment, $P_1$, $P_2$ and $P_B$ are the units of the LTSM model of block 450.

The resultant output of block 450 are fed through block 460. Block 460 is a dense layer that provides learning features from all the combinations of the features of the previous layer and adds Q1 Q2, and QB, respectively referenced as 416A, 416B, and 416N.

In this embodiment, $Z_1$ $Z_2$, and $Z_N$ (respectively referenced as $\mathbf{418}_A$, $\mathbf{418}_B$, and $\mathbf{418}_N$) are the result output of the workflow of block diagram 400. Collectively, $\mathbf{418}_A$, $\mathbf{418}_B$, and $\mathbf{418}_N$ represents the modeled output of end to end execution flow of a single request. $\mathbf{418}_B$, and $\mathbf{418}_N$ are referenced as S1 and is depicted being incorporated into the model described in FIG. 3.

Figure 5:
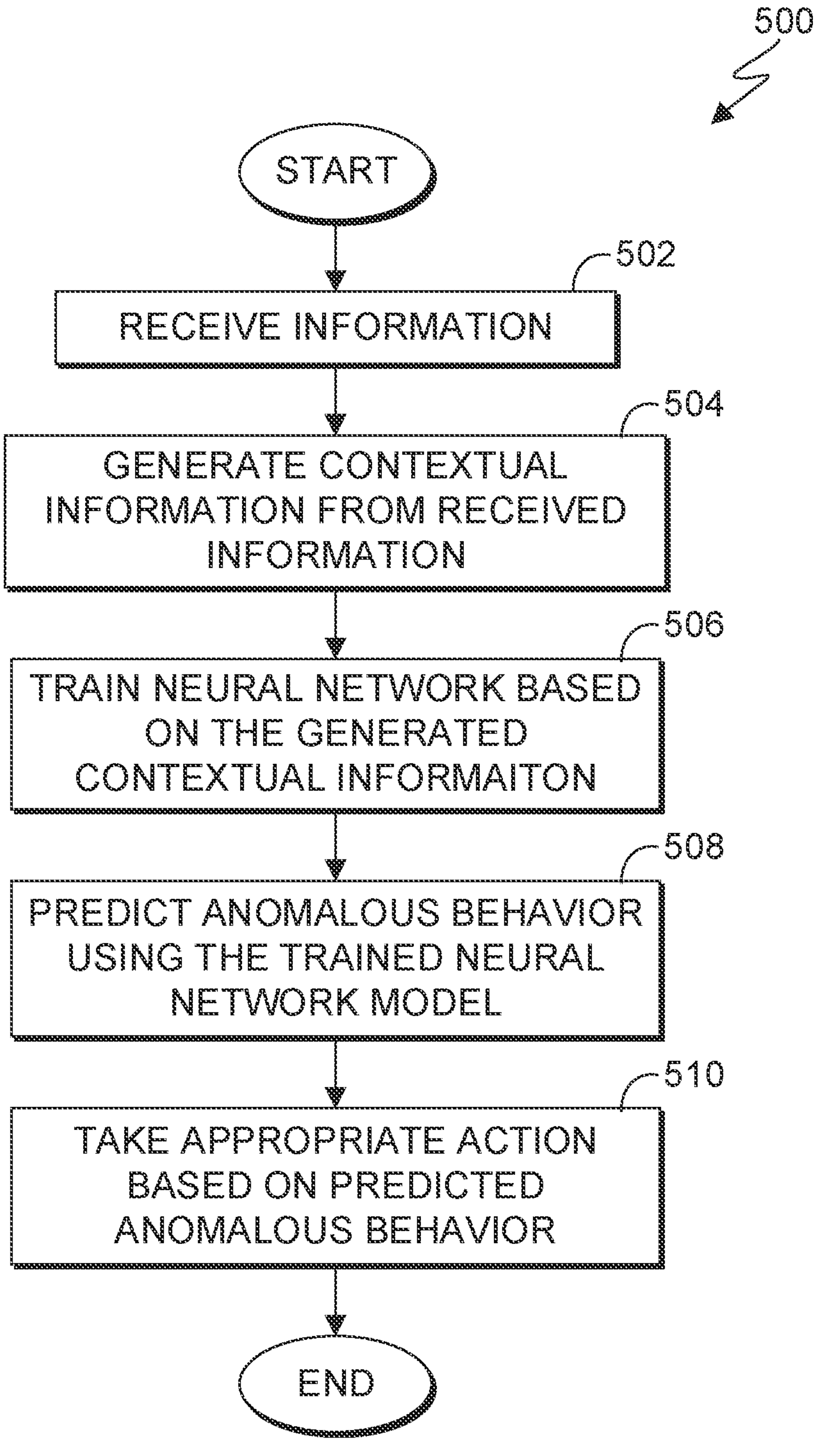
FIG. 5 depicts operational steps for predicting anomalous behavior, in accordance with an embodiment of the present invention.

FIG. 5 is a flowchart 500 that depicts operational steps for predicting anomalous behavior, in accordance with an embodiment of the present invention.

In step 502, anomaly detector 110 receives information. In this embodiment, received information can include an end user request for an application comprises N microservices. For example, an end user request is request triggered by user's demand to the front-end service. For example, when user accesses a webpage and hit the login button, a login request is generated to the application.

In this embodiment, anomaly detector 110 receives a request from client computing device 102. In other embodiments, anomaly detector 110 can receive information from one or more other components of computing environment 100.

In step 504, anomaly detector 110 generates contextual information from received information. In this embodiment, anomaly detector 110 generates contextual information from the received request by requesting additional information and creating a hierarchal data structure that represents the end to end details of a received request.

Specifically, anomaly detector 110 can request for additional information (e.g., request specification) can include a username associated with a user (anonymized ID), corporate name (anonymized ID), latency (e.g., 500 ms), region (e.g., Europe), browser type, device type, operating system, time Friday, Feb. 28, 2020 2:55:02 PM GMT-05:00), a microservice path, and function path.

The request for contextual features can be sent to or otherwise collected from difference sources. In this embodiment anomaly detector 110 includes a collection agent (shown and discussed in FIG. 2) that is deployed within each microservice instance as a side car (e.g., two containers of a single Kubernetes Pod) and can pull from two different sources: trace data from the microservice such as Jaeger, and OpenTelemetry) and characteristics of the microservice runtime (e.g., CPU, memory utilizations, network, other collocated sidecars, Zabbix-Agent (e.g., CPU, Disk, memory, etc.), Istio's Envoy (e.g., network), etc.).

From these sources, anomaly detector 110 can collect categorical data and numerical data. In this embodiment, categorical data refers to a request and microservice instance that are extracted from either the request header or the environment variables on the deployment host. In this embodiment, numerical data refers to data that reports the time spent on each microservice and its critical functions from distributed tracing library such as OpenTelemetry or Jaeger. In this manner, anomaly detector 110 can leverage the numerical data reports that report, record, and retrieve information on respective system utilization with proper privileges. Accordingly, by collecting contextual features from different sources, anomaly detector 110 can enable a holistic view of processing the request across layers.

In step 506, anomaly detector 110 trains a neural network based on the generated contextual information. In this embodiment, anomaly detector 110 trains a neural network based on the generated contextual information comprising inter and intra request factors. As mentioned earlier, an inter-request describes connections among characteristics in request-specifications (e.g., a login request of a user id from certain region is highly likely to be followed by a get_request to the product catalog page from the same region user id). In contrast, an intra-request factor takes into account the factors of individual requests to understand which services during the processing path play the most important roles for future requests from the casually related microservice- and function path data. By considering these two factors, the built neural network model can capture the correlation between a respective microservice and the last step. In this manner, the trained neural network can predict what the next series of requests and their contextual request look like. Then based on the predictions, the controller module will determine if there will be any anomaly.

In step 508, anomaly detector 110 predicts anomalous behavior using the trained neural network model. For example, anomaly detector 110 can predict anomalies such as SLA violations (e.g., in the next ten minutes, tail latency will increase), users that will be impacted (e.g., a subset of users in the U, south region), and the impact of a subset of requests (e.g., retrieving analysis results will fail)

In step 510, anomaly detector 110 takes appropriate action based on the predicted anomalous behavior. In this embodiment, an appropriate action can by generated a proactive alert, generating a root cause report, providing resource management abilities, and system simulation. For example, anomaly detector 110 can then determine whether or not to send a proactive alert based on the prediction. In this embodiment, anomaly detector 110 can automatically generate a proactive alert in response to predicting an anomaly. In another embodiment, anomaly detector can generate a weighted score for the predicted anomaly and, in response to the predicted anomaly meeting or exceeding the threshold value for anomalous behavior, generate a proactive alert.

For example, a proactive alert can contain the following predictions: SLA violations in the next ten minutes, tail latency will increase), users that will be impacted (e.g., a subset of users in the U, south region), and the impact of a subset of requests (e.g., retrieving analysis results will fail).

An example of a root cause report can include an identification of the failed microservice instance as well as reasons for the failure. For example, slow database connection, insufficient computing resources, etc.

In some embodiments, resource management can include recommended fixes. For example, anomaly detector 110 can recommend provisioning the microservice instances at a node with higher capacity, increase the network bandwidth between backend and database, add a node with more power CPU, etc.

Figure 6:
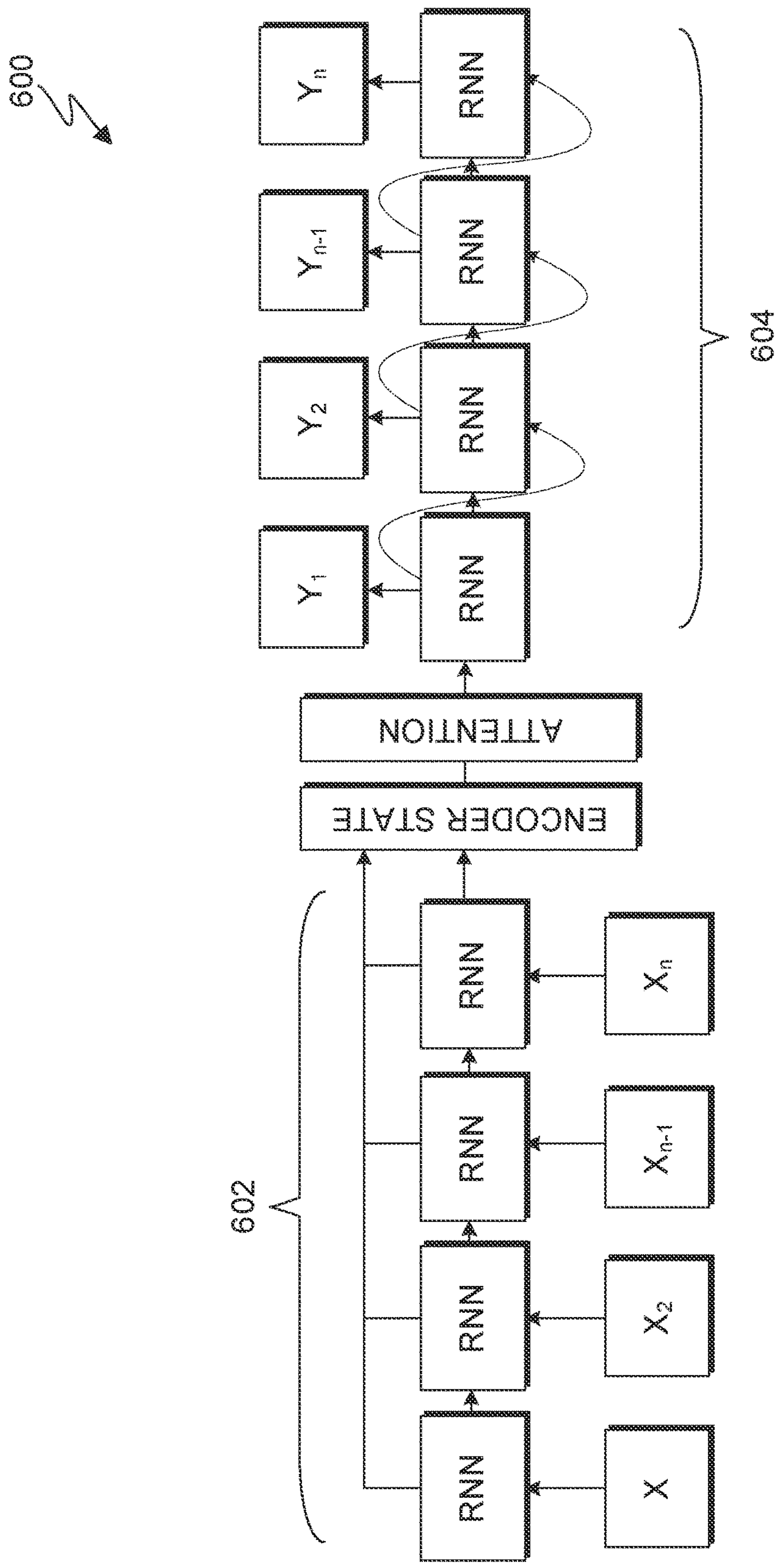
FIG. 6 shows an example diagram, in accordance with an embodiment of the present invention.

FIG. 6 shows an example diagram 600, in accordance with an embodiment of the present invention.

For example, FIG. 6 shows an overview of the sequence to sequence (seq2seq) model with the encoder and decoder part, their input and output (representing the methodology described above. Both the encoder (e.g., blocks 602) and decoder (e.g., blocks 604) part are RNN-based and capable of consuming and returning output sequences corresponding to multiple time steps. The model gets input from the previous N values and it returns the next N predictions. N is a hyperparameter and set empirically as 10 minutes in this figure. In the middle of the diagram is a hierarchical RNN-based anomaly detector neural network that includes three main components: intra-request factor, inter-request factor, and embeddings.

Specifically, the diagram in FIG. 6 is an encoder-decoder architecture (as known as., seq2seq model). In this embodiment, X, $X_1$, $X_2$, . . . , Xn, represents the input to the model that are the request contextual data of a series of requests. In this embodiment, Y, $Y_1$, $Y_2$, . . . . $Y_n$, are the output of the model, are the predictions of the model. The inner architecture of the model are detailed and previously discussed throughout FIGS. 3 and 4.

FIGS. 7A and 7B shows example data collection codes, in accordance with an embodiment of the present invention.

Specifically, FIG. 7A depicts example data collect code 700 which is example application code in a respective microservice.

With respect to FIG. 7B, 7B depicts example data collect code 750. Specifically, example data collect code 750 represents code in a collect agent.

Figure 8:
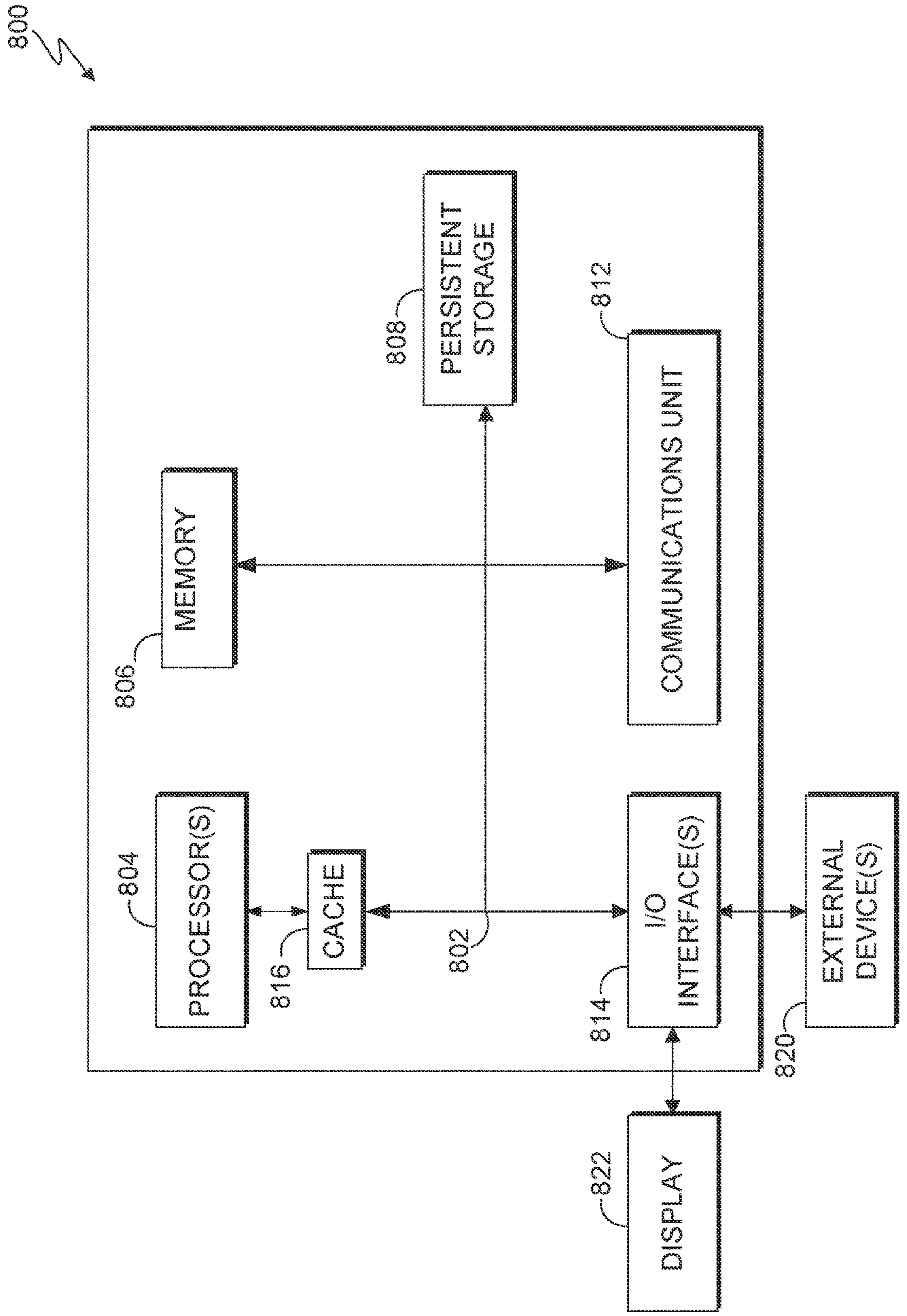
FIG. 8 is a block diagram of an example system, in accordance with an embodiment of the present invention.

FIG. 8 depicts a block diagram of components of computing systems within computing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 800 includes communications fabric 802, which provides communications between cache 816, memory 806, persistent storage 808, communications unit 812, and input/output (I/O) interface(s) 814. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Anomaly detector 110 (not shown) may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard chive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 includes one or more network interface cards. Communications unit 812 may provide communications through the use of either or both physical and wireless communications links. Anomaly detector 110 may be downloaded to persistent storage 808 through communications unit 812.

I/O interface(s) 814 allows for input and output of data with other devices that may be connected to client computing device and/or server computer. For example, I/O interface 814 may provide a connection to external devices 820 such as a keyboard, keypad, a touch screen, and/or some other suitable input device. External devices 820 can also include portable computer readable storage media such as, for example, thumb drives, portable optical or magnetic disks, and memory cards. Software and data used to practice embodiments of the present invention, e.g., anomaly detector 110, can be stored on such portable computer readable storage media and can be loaded onto persistent storage 808 via I/O interface(s) 814. I/O interface(s) 814 also connect to a display 822.

Display 822 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent, to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FURTHER COMMENTS AND/OR EMBODIMENTS

Some embodiments of the present invention recognize the following facts, potential problems and/or potential areas for improvement with respect to the current state of the art: Microservice architecture is appealing for applications deployed in hybrid cloud environment because the loosely coupled components offer better scalability, flexibility, accelerated developer productivity, etc. To avoid serious financial and business losses caused by SLA violation, one of the most critical tasks in managing the microservice application is to effectively and efficiently detect and diagnose anomalies in certain time steps such that DevOps/SRE can take further actions to resolve the underlying issues in a timely manner. However, existing approaches for emitting proactive alert on detected anomaly are still not effective for microservice applications because they don't consider the spatial and temporal dependencies buried in the multivariate time series data from the decoupled services and end users' requests.

Some embodiments of the present invention may include one, or more, of the following features, characteristics and/or advantages: A tail latency issue is learned in the model and help to predict a potential anomaly before it happens.

Embodiments of the present invention predict anomaly and identify the root case for microservice applications. Among the existing work of anomaly prediction, embodiments of the present invention are the first to conduct dual tasks to predict the request pattern and its path (i.e., the services a request go through). Embodiments of the present invention design the collection-agent to collect data from the application deployment. The system supports microservice applications deployment in different environments, private, public, and hybrid.

Embodiments of the present invention define the concept of request contextual feature, a data structure that includes three level of information of a request: request-specification, microservice-path, function-path. This proposed feature integrates inter-request factors and intra-request factors, two historical data that influence the performance and processing path of incoming requests.

Embodiments of the present invention design a hierarchical neural network model to integrate the training data of request contextual feature. The model is based on seq2seq architecture with embedding of heterogeneous data and attention mechanism, which leads to a certain level of interpretability of results.

The unique benefit of application-specific system tracing information is twofold. We leverage the time stamped system utilization information to understand and predict system resource requirement to further guide the system admin to reallocate the resource to meet the QoS requirement. We also use the detailed fine-grained system characterization derived from the application on y to understand the various hardware implications and tradeoffs through system simulation and use such lessons as the input for future cloud system design.

Embodiments of the present invention empower proactive alert and anomaly diagnosis for microservice applications by horizontally and vertically analyzing the aforementioned dependencies available in the request con-textual data with deep learning. The proposed approach addresses two specific questions: (1) will there be any performance anomaly (e.g., SLA violation, increased tail latency) occur at certain time steps elapsed from the current moment? and (2) if (1) is true, what is the most likely microservice(s) that causes the anomaly? The first question is regarding the anomaly prediction, and the second one tells the root cause of the predicted anomaly.

Solution

The problem of proactive alert and anomaly diagnosis can be viewed as a prediction task on how a set of micro services cooperatively processes the future requests. Our proposed technique is a neural network approach to integrate detailed characteristics of historical requests, including both its specifications and traced information on each micro service instances along the path. The neural network model can predict whether any anomaly (e.g., tail latency, SLA violation) will occur and what will be the root cause(s). The solution is independent of the deployment of the microservice application (private cloud, public cloud, or hybrid) and supports a variety of container orchestrators, e.g., Kubernetes, OpenShift.

Key Ideas

Key idea 1: We introduce the concept of request contextual feature, a hierarchical data structure that represents the end to end details of a request, including the causally-related service and call path, as well as the execution context (e.g., CPU, accelerator, memory utilization, region of the pod, network track, IO re-quests, etc.) at each microservice. The request contextual feature is composed of information in three categories: request-speciation, microservice-path, and function-path (details in Section 6.2). Each category contains data with heterogeneous forms, such as scalar, vector, categorical. Those collected feature points will be provided as training data to the neural network.

Key idea 2: We develop a method to collect data for the request contextual feature from different sources (Section 6.1). Categorical data that describe a request and microservice instance are extracted from either the request header or the environment variables on the deployment host. Numerical data that report the time spent on each microservice and its critical functions are from distributed tracing library such as Open Telemetry or Jaeger, while data that report resource usage are recorded through retrieving information on the system utilization with proper privileges. As a result, the request contextual feature offers a holistic view of processing the request across layers.

Key idea 3: We construct a neural network model to predict how future re-quests are processed within the microservice application by handling the afore-mentioned request contextual feature as inputs hierarchically We believe the request processing prediction is a long-distance dependent sequential problem. That is, processing a request in the near future relies on two groups of factors: inter-request factors and intra-request factors. The inter-request fac-tors describe connections among characteristics in request-specifications, such as http method, username, region. For instance, a login request of a userid from certain region is highly likely to be followed by a get request to the product catalog page from the same region and userid. The intra-request factors take into account the factors of individual requests. In processing a request, microservices of the application collaborate by sending RPC calls among each other. Further, since each microservice often has many replicas, not all instances appear in the call path. An effective model should be able to understand which services during the processing path play the most important roles for future requests from the casually related microservice- and function path data. All the above factors are captured by the proposed model during training process.

Key idea 4: During monitoring, the model generates representations of predicted requests one-time step at a time, capturing complex inter- and intra-request dependencies. A controller is created to interpret the sequence of pre-dictions: looking into key performance metrics (e.g., latency), calculating the statistical measures (e.g., deviation, percentile), and determining whether to raise an alert. Once the controller decides to raise, the root cause analysis mod-tale interprets the sequential representations, supplemented by current trend, to pinpoint the root cause (e.g., shortage of memory on certain micro service instance in a region, slow connection between certain micro service instance and a backend storage).

Motivating Example

We describe a motivating example of the prediction problem which is a microservice application composed of 4 services. Each request must be processed by A and B, and then by either C or D. In this specific scenario, there are two historical requests; the service path are A→B→C and A→B→D. If we only consider the sequence of these requests (i.e., the inter-request factors) to predict the next request and its path, the result is A→B→C. The model learned from the inter-request factors considers the request sequence as an important feature in the prediction process. Given that C and D appear alternately in the historical data due to some effect of load balancing, the result is reasonable and the predicted total latency is <1 s. On the other hand, our proposed model intelligently preserves more attention for the latencies along the service path, which might be due to the increased processing time at service instance A as well as the correlation between A and the choice of last hop. Therefore, it can successfully predict the right next request and its path A→B→D because service D is more likely to be selected if the latency at A is high. Since the total latency of the predicted request is 2.3 s which is greater than a threshold say 1.5 s, a proactive alert will be sent to the SRE. To make the correct predictions, we need to jointly consider the inter-request factors and the intra-request factors in individual requests, which can be discovered from the detailed information of the request path, such as the trace data, resource utilizations, and the specifications.

Description

This section introduces the methodology and technical details we proposed for addressing the proactive alert and anomaly diagnosis problem for microservice applications. In the first phase, we collect trace data and specifications for a sequence of requests for both normal and anomalous behavior and prepare them for feature extraction. In this second phase, we assemble request contextual features from the collected data and generate the neural network model. The third phase is responsible for predicting anomaly using the previously trained model and presents a list of root causes.

As discussed in FIG. 2 earlier high-level architecture of the proposed system, where an application composed of N microservices with our custom designed collection agents, and the model creation and prediction pipeline. The remaining of this section explains the end to end ow in detail.

Data Collection

First (as described in flowchart 500, steps 502-504) the collect-agent gathers trace data from the co-located microservice. The pair of microservice and collect-agent run in separate containers of a single Kubernetes pod. The microservice runs application code to process requests and pass them to the downstream services. Furthermore, the collect-agent can aggregate important system information from the sidecars such as Zabbix agent or Istio's Envoy proxy.

The application code running inside the microservice uses some distributed tracing library, like Jaeger or Open Telemetry, to record the time spent on functions critical to the business logic, and send the trace data to the collect-agent in UDP packets. Note that the proposed method requires the specification of user request to be captured at the front-end service for only once (e.g., see previously discussed FIG. 7A). In addition to the trace information in the microservice, the collect-agent must acquire not only the static configuration of the microservice instance, but also the dynamic resource utilization on receiving trace from the microservice (see e.g., previously discussed FIG. 7B). Such data can be retrieved from the sidecars as mentioned earlier. The collect-agent places these data into batches and delivers them to a centralized collector.

The collector is implemented as a stateless server, so it can be scaled to many replicas. The collector receives the trace data and specifications of requests, normalizes them to certain common representation, and push to a queue. One example of the queue is Kafka, an open source software that provides a high-throughput, low-latency platform for handling real-time data feeds (up to million writes per second.

The anomaly detector can then pull, from the queue, to the feature extraction module, which is developed as a streaming-based job atop the Flink framework. The job of feature extraction is to transform collected data to the form of request contextual feature.

Feature Description

We summarize the collected feature into three categories: request-specification, microservice-path, function-path. Request-specification is static and includes self-description information of the requests, most importantly its end-to-end latency across the set of microservices composing the application. Microservice-path features and function-path features are collected as causally related data to describe the processing path of the requests. FIG. 6 shows the hierarchical data structured collected at each step during a time window.

Neural Network Model

The design of our neural network model is rooted in a seq2seq architecture. As previously described in FIG. 6 the neural network model includes the encoder and decoder part, their input and output. Both the encoder and decoder part are RNN-based and capable of consuming and returning output sequences corresponding to multiple time steps. The model gets input from the previous N values and it returns the next N predictions. N is a hyperparameter and set empirically as 10 minutes. In the middle of the diagram is a hierarchical RNN-based anomaly detector neural network that includes three main components: intra-request factor, inter-request factor, and embeddings. The remaining of this section describes the detail of the neural network.

As mentioned earlier FIG. 3 illustrates the design of the neural network. For the intra-request factor, we combine the sequential microservice path feature and the corresponding request specifications. The microservice path feature is detailed in FIG. 4 which is another RNN-based network. For the inter-request factor, we fed the intra-request factors of a sequence of requests to another RNN layer (e.g., LSTM) for training the inter-request pattern. Throughout the network, we apply different embedding layers (e.g., word2vec, ELMO) to convert heterogeneous data into N-dimensional vectors (e.g., N=300). The hierarchical request forecasting neural network has the ability to learn the influences of inter-request and intra-request pattern on the processing of future request. As emphasized earlier, embodiments of the present invention aim to predict the specification of future requests, as well as their path through the microservice instances of the application.

Monitoring and Insights

Our proactive anomaly detection problem contains two major tasks: prediction of future requests with their detailed service path and anticipation of SLA violation based on the predictions (step 508 in FIG. 5). The first one is enacted by the prediction module (e.g., step 510 of FIG. 5). During the monitoring phase, the system continuously collects the request contextual data from the running application and ingest them to the prediction module. These data are fed into the neural network model fetched from the storage. The output of the prediction module is a sequence of requests with their predicated execution details that will occur in the next $W_t$ second. For example, we set $W_t$ to 500 ms due to empirical experience so that the automatic resource partitioning software has the opportunity to take actions.

For the second task of determining proactive alert, we integrate a controller to interpret the outputs from the prediction module. As shown in FIG. 2 as well as steps 510 in FIG. 5, the controller has multiple functions. Regarding the proactive alert, we calculate the tail of the predicted latencies. If the result is larger than certain threshold, a proactive alert will be raised. The details of the predicted results will be further leveraged for sophisticated mission such as root cause analysis, resource management, system simulation.

System simulation: Output of FIG. 3, contains the detailed system (including CPU, memory, disk and network usages) tracing information of application on fly from Zabbix agent. As discussed in FIG. 1, system simulation, such fine-grained characterized traces provide insights of the application demanding on the underlying hardware system, which can further be used as the driver of the system simulator to evaluate the potential cloud system designs to learn the challenges and tradeoffs. This process helps the cloud system designers to understand the interactions between different composable hardware components such as storage, network, CPU, memory and accelerator from various applications. It also helps to analyze the potential benefits vs. degradations with various hardware configurations and guide the design decision for the future cloud system.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

in response to receiving a request, collecting trace data and specifications for a sequence of requests from an application comprising multiple microservices, wherein the collected trace data and specifications comprise respective trace data and specifications collected at each microservice instance of the multiple microservices;

identifying inter-request factors and intra-request factors from the collected trace data and specifications;

generating request contextual features comprising spatial and temporal dependences from the inter-request factors, the intra-request factors, and the collected trace data and specifications;

building and training a recurrent neural network model using the generated contextual features as inputs;

predicting anomalous behavior of a future request of the application based on spatial and temporal dependencies using the trained recurrent neural network model, wherein the anomalous behavior comprises a service level agreement violation, and wherein the predicting further comprises predicting a region of impacted users and an impact on a subset of requests, wherein the impact specifies a type of request that will fail;

generating, in response to prediction of the anomalous behavior, a proactive alert which comprises the region, the impact, and a reason for the prediction of the anomalous behavior; and providing a system simulation for the predicted anomalous behavior of the future request;

wherein results of the system simulation comprise details of an end-to-end execution flow at each microservice instance of a microservice path of the future request comprising central processing unit usage, memory usage, disk usage, and network usage of the microservice application.

2. The computer-implemented method of claim 1, further comprising: generating visualizations associated with the predicted anomalous behavior.

3. The computer-implemented method of claim 1, further comprising: generating a root cause report for the predicted anomalous behavior.

4. The computer-implemented method of claim 1, wherein the trace data provides a hierarchal data structure that separates logs into individual requests.

5. The computer-implemented method of claim 1, wherein the request contextual features comprises:

a data structure that includes three level of information of a request: request-specification, microservice-path and function-path.

6. The computer-implemented method of claim 1, further comprising:

predicting a component of one or more services within a cloud infrastructure is responsible for the service level agreement violation using contextual data that includes traces that separate logs into individual requests.

7. The computer-implemented method of claim 6, further comprising:

identifying a respective service that caused a specific request of a group of received requests to fail.

8. A computer program product comprising:

one or more computer readable storage media and program instructions stored on the one or more computer readable storage media, the program instructions comprising;

program instructions to, in response to receiving a request, collect trace data and specifications for a sequence of requests from an application comprising multiple microservices, wherein the collected trace data and specifications comprise respective trace data and specifications collected at each microservice instance of the multiple microservices;

program instructions to identify inter-request factors and intra-request factors from the collected trace data and specifications;

program instructions to generate request contextual features comprising spatial and temporal dependences from the inter-request factors, the intra-request factors, and the collected trace data and specifications;

program instructions to build and train a recurrent neural network model using the generated contextual features as inputs;

program instructions to predict anomalous behavior of a future request of the application based on spatial and temporal dependencies using the trained recurrent neural network model, wherein the anomalous behavior comprises a service level agreement violation, and wherein the predicting further comprises predicting a region of impacted users and an impact on a subset of requests, wherein the impact specifies a type of request that will fail;

program instructions to generate, in response to prediction of the anomalous behavior, a proactive alert which comprises the region, the impact, and a reason for the prediction of the anomalous behavior; and program instructions to provide a system simulation for the predicted anomalous behavior of the future request; wherein results of the system simulation comprise details of an end-to-end execution flow at each microservice instance of a microservice path of the future request comprising central processing unit usage, memory usage, disk usage, and network usage of the microservice application.

9. The computer program product of claim 8, wherein the program instructions stored on the one or more computer readable storage media further comprise;

program instructions to generate visualizations associated with the predicted anomalous behavior.

10. The computer program product of claim 8, wherein the program instructions stored on the one or more computer readable storage media further comprise:

program instructions to generate a root cause report for the predicted anomalous behavior.

11. The computer program product of claim 8, wherein the trace data provides a hierarchal data structure that separates logs into individual requests.

12. The computer program product of claim 8, wherein the request contextual features comprise:

a data structure that includes three level of information of a request: request-specification, microservice-path and function-path.

13. A computer system comprising:

one or more computer processors;

one or more computer readable storage media; and program instructions stored on the one or more computer readable storage media for execution by at least one of the one or more computer processors, the program instructions comprising:

program instructions to, in response to receiving a request, collect trace data and specifications for a sequence of requests from an application comprising multiple microservices, wherein the collected trace data and specifications comprise respective trace data and specifications collected at each microservice instance of the multiple microservices;

program instructions to identify inter-request factors and intra-request factors from the collected trace data and specifications;

program instructions to generate request contextual features comprising spatial and temporal dependences from the inter-request factors, the intra-request factors, and the collected trace data and specifications;

program instructions to build and train a recurrent neural network model using the generated contextual features as inputs;

program instructions to predict anomalous behavior of a future request of the application based on spatial and temporal dependencies using the trained recurrent neural network model, wherein the anomalous behavior comprises a service level agreement violation, and wherein the predicting further comprises predicting a region of impacted users and an impact on a subset of requests, wherein the impact specifies a type of request that will fail;

program instructions to generate, in response to prediction of the anomalous behavior, a proactive alert which comprises the region, the impact, and a reason for the prediction of the anomalous behavior; and program instructions to provide a system simulation for the predicted anomalous behavior of the future request; wherein results of the system simulation comprise details of an end-to-end execution flow at each microservice instance of a microservice path of the future request comprising central processing unit usage, memory usage, disk usage, and network usage of the microservice application.

14. The computer system of claim 13, wherein the program instructions stored on the one or more computer readable storage media further comprise:

program instructions to generate visualizations associated with the predicted anomalous behavior.

15. The computer system of claim 13, wherein the program instructions stored on the one or more computer readable storage media further comprise:

program instructions to generate a root cause report for the predicted anomalous behavior.

* * * * *